Figure 1:
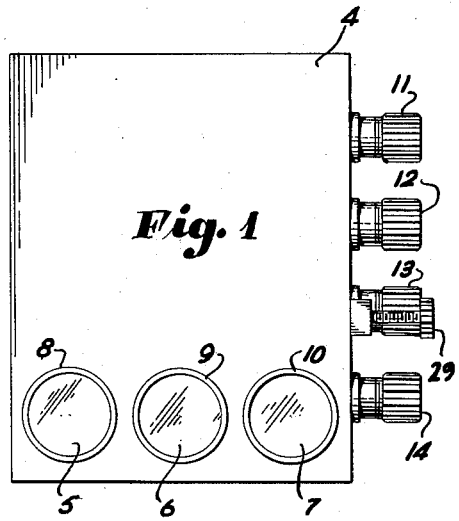

Sept. 10, 1963

H. H. LONG 3,103,654

MECHANISM FOR INDICATING THE RELATIVE
MECHANICAL LOAD ON A DRIVE MOTOR

Filed May 13, 1959

2 Sheets-Sheet 1

INVENTOR.
HAROLD H. LONG
BY
Bean, Brooks, Buckley & Bean
ATTORNEYS.

United States Patent Office 3,103,654
Patented Sept. 10, 1963

3,103,654
MECHANISM FOR INDICATING THE RELATIVE MECHANICAL LOAD ON A DRIVE MOTOR
Harold H. Long, 362 Fox St., Buffalo, N.Y.
Filed May 13, 1959, Ser. No. 812,964
9 Claims. (Cl. 340—248)

This invention relates generally to the indicator art, and more specifically to a new and useful mechanism for indicating the relative mechanical load on an electric motor.

It is common to provide electric motors with overload protection devices, which function to protect the motor in the event it is loaded beyond its designed capacity. However, such devices do not function to indicate the relative load on the motor, so long as such load is within the permissible limit for which the motor is designed. Such an indication can be very helpful, and is much to be desired in many situations.

For example, where the electric motor is driving a machine tool, the load on the motor is a function of tool sharpness. As the tool bit begins to wear it becomes less efficient, and more drive power is required for the tool to do its intended work. This places an increased load on the drive motor. While the motor might be more than capable of supplying the increased power, such an operation is relatively inefficient and, rather than utilizing greater driving power it is preferred to either replace or repair the worn tool bit. In such situation, it will be appreciated that the problem is not one of protecting the electric motor, but one of indicating to an attendant when the tool bit is beginning to wear and needs attention. Other situations in which it is desired to know the relative mechanical load on a driving motor, wherein the latter is by no means overloaded, will readily occur to those skilled in the art.

Accordingly, it is a primary object of my invention to provide a mechanism which will directly indicate the relative mechanical load on an electric drive motor, as reflected in the energization required by the motor, thereby indicating whether the driven machine is performing in the desired manner, whether its condition of operation is beginning to deteriorate, and whether its condition of operation is such as to require attention.

Still another object of my invention is to provide the foregoing in a relatively simple an inexpensive mechanism which is readily adapted to existing installations without material modification thereof.

Still another object of my invention is to provide the foregoing in a mechanism which is adjustable, to adapt it to different situations.

In one aspect thereof, a mechanism for continuously indicating the relative mechanical load on a drive motor constructed in accordance with my invention is characterized by the provision of a solenoid operatively arranged in the motor energizing circuit so as to be energized in proportion to the energization of the motor whenever the latter is energized, the solenoid having a movable armature the position of which is determined by the degree of energization of the solenoid, with indicator means responsive to the position of the armature for indicating the degree of energization of the motor and, therefore the relative mechanical loading thereof.

Figure 2:
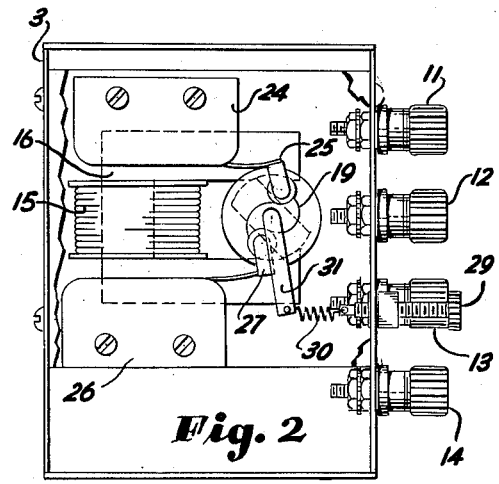
Figure 4:
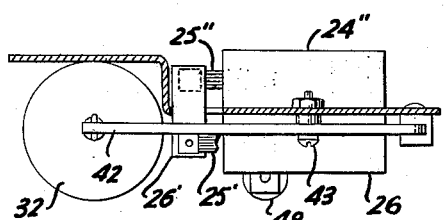
Figure 3:
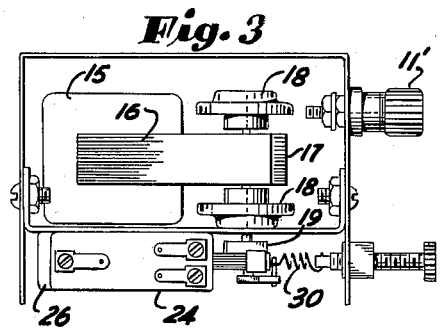
Figure 5:
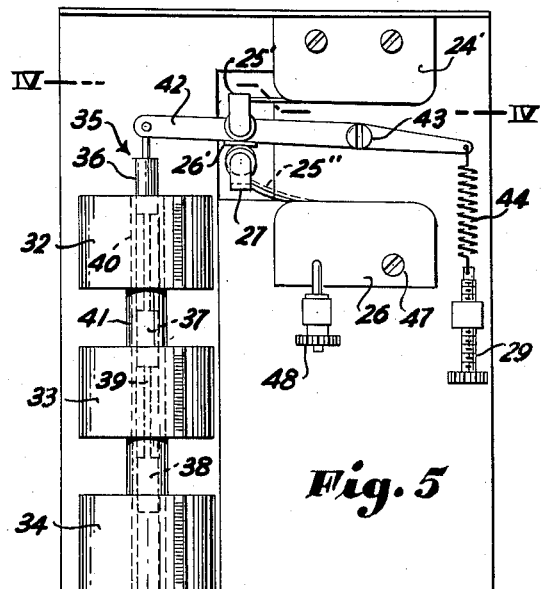
Figure 6:
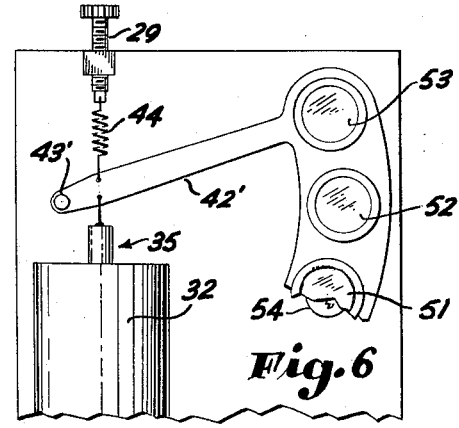
Figure 7:
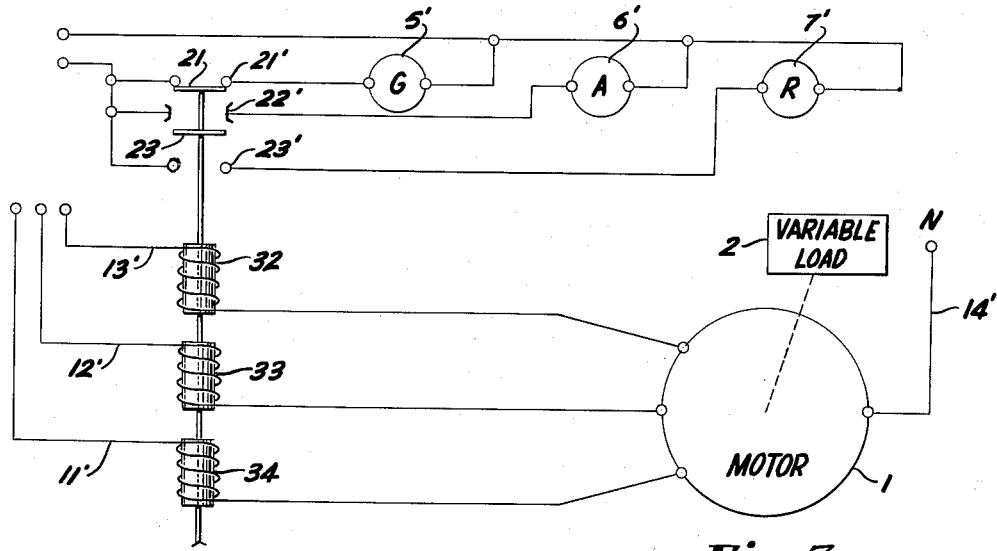
Figure 8:
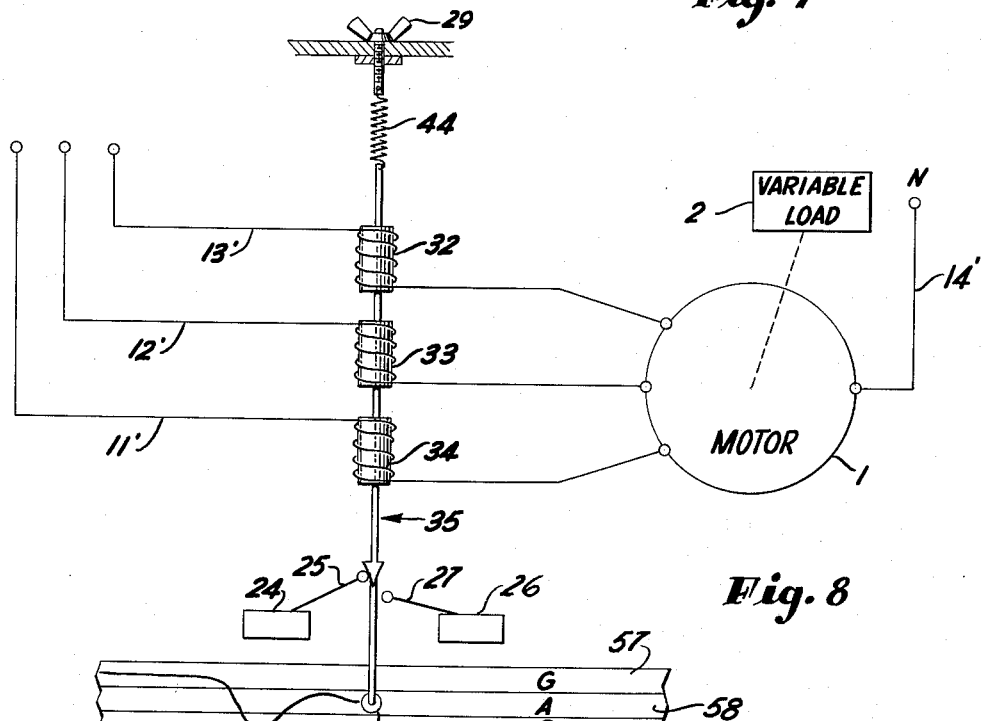

The foregoing and other objects, advantages and characterizing features of an electric motor mechanical load indicating device constructed in accordance with my invention will become apparent from the ensuing detailed description of certain illustrative embodiments thereof, considered in conjunction with the accompanying drawings which illustrate the same wherein like reference numerals denote like parts throughout the various views and wherein:

FIG. 1 is a front elevational view of one form of mechanism of my invention;
FIG. 2 is a generally diagrammatic view thereof with the front cover removed;
FIG. 3 is a transverse sectional view thereof;
FIG. 4 is a transverse sectional view of the modified embodiment shown in FIG. 5;
FIG. 5 is a view corresponding to FIG. 2, but showing another form of my invention;
FIG. 6 is a generally diagrammatic view of still another embodiment thereof;
FIG. 7 is a generally schematic circuit diagram illustrating my invention; and
FIG. 8 is another generally schematic circuit diagram, showing my invention with recording means incorporated therein.

Referring now in detail to the accompanying drawings, the mechanism of my invention is intended for use with an electric motor 1 (FIGS. 7 and 8), which can be either single or polyphase A.C., or of the D.C. type, and which drives a variable mechanical load indicated at 2. In the embodiment of FIGS. 1–3 the mechanism is enclosed within a housing 3 having a removable cover 4 which can carry colored lenses 5, 6 and 7 mounted in removable, interchangeable frames 8, 9 and 10, which lenses are adapted to be illuminated by illuminating means in the form of associated light bulbs 5', 6' and 7' (FIG. 7). Housing 3 has terminal posts 11, 12, 13 and 14 adapted for connection to the leads or conductors 11', 12' and 13', respectively, of a three-phase energizing circuit for motor 1, and to the neutral or ground 14' (see FIG. 7). Where the mechanism is to be used with less than a three-phase A.C. energizing circuit, or with a D.C. circuit, a corresponding number of the terminals 11, 12 and 13 will be used, the manner of connection being obvious to those skilled in the art.

The internal mechanism shown in FIGS. 2 and 3 is for use with single phase A.C. or D.C., only the terminals 11 and 14 being utilized, and comprises a solenoid winding 15 arranged to energize a core 16 of laminated magnetic material having operatively associated therewith an armature 17 journalled in bearings 18 and carrying a cam 19.

Energizing circuits are provided for the lights 5', 6' and 7', as indicated in FIG. 7, which circuits are controlled by switch means comprising a first contact member 21 normally closing the contact points 21' to complete an energizing circuit for the light 5', normally open contact points 22' adapted to be bridged by the member 21 to complete an energizing circuit for the light 6', and contact points 23' adapted to be bridged by a contact member 23 to complete an energizing circuit for light 7'. In the embodiment of FIGS. 2 and 3 member 21 and the contact points 21' and 22' are carried within a switch housing 24 comprising a two-way switch having a spring biased follower 25 bearing against the cam 19, and the member 23 and contact points 23' are carried within a switch housing 26 having a spring biased follower 27 riding on the cam 19.

When the mechanism of my invention is installed, the solenoid winding 15 is connected in series in the energizing circuit of motor 1, as will be more particularly described hereafter with reference to another embodiment, whereby the winding 15 is energized in proportion to the degree of energization of the motor 1, whenever the latter is energized. The mechanism is designed, and adjusted by means to be described, so that when the load 2 imposes only a normal loading on motor 1, the energization of solenoid winding 15 is such as to cause armature 17 to assume a position maintaining the switch 21, 21' closed and the other switches open, this being the condition depicted in FIG. 7 wherein the light 5' is illuminated. Light 5' is associated with the lens 5 which will be green in color, indicating that a normal and efficient condition of operation exists with respect to load 2.

However, should the load 2 increase, placing an increased burden on motor 1, that fact will be reflected by an increased energization of motor 1, and consequently of the solenoid winding 15, causing the armature 17 to change its position. This moves the cam 19 such that, upon a predetermined increase in the level of energization of motor 1 and consequently solenoid winding 15, the contact member 21 will shift from the contact points 21′ and engage the contact points 22′, thereby deenergizing the light 5′ and energizing the light 6′ associated with lens 6 which preferably is amber in color, giving a clear visual warning to an attendant that the load is increasing, and that attention will be needed. In effect, this puts the attendant on notice that here is a condition to be carefully watched even though, in the case of a machine tool, for example, the tool bit does not need replacing or resharpening as yet.

Finally, when the load 2 increases further, causing increased energization of motor 1 to a predetermined level, this will be reflected in a correspondingly increased energization of the solenoid winding 15 shifting armature 17 and cam 19 to still another position in which the contact member 21 is disengaged from both contact points 21′ and 22′, and the contact member 23 engages contact points 23′, thereby deenergizing light 6′ and energizing light 7′ associated with the lens 7, which will be colored red, clearly indicating that the driven load 2 requires attention, even though the motor 1 might be loaded far below its permissible maximum.

Therefore, it is seen that with the mechanism of my invention there is provided a continuous indication of the relative mechanical loading of the motor 1, which indicates to an attendant the relative condition of the load 2 which it is desired to observe. To enable the attendant to adjust the level of energization at which the mechanism changes from the green to the yellow signal, to give a first warning, I provide an adjusting screw 29 connected to one end of a biasing spring 30 which is connected at its other end to a lever 31 in turn connected to the armature 17. In this way, the initial position of the armature and the cam 19 can be selectively regulated.

Another form of mechanism constructed in accord with my invention is illustrated in FIGS. 4 and 5, and comprises three solenoid windings 32, 33 and 34 responsive to the current in each phase of a three phase motor energizing circuit, being connected as illustrated in FIG. 7. A common armature, generally designated 35, is provided and comprises armature members 36, 37 and 38 joined by non-magnetic connecting rod elements 39. Armature 35 moves within a split brass tube 40, or the like, to eliminate induction, and the windings having non-magnetic, insulating spacers 41 therebetween. The armature 35 is connected to one end of a lever 42 pivoted at 43 and counterbalanced by a spring 44 whereby the armature is floating. Also, the armature 35 occupies an intermediate position at rest, as illustrated, whereby there is an absolute minimum of inertia to overcome upon energization of the solenoid windings, resulting in an extremely fast response. Again, an adjusting screw 29 is provided, to adjust the level of energization required before the mechanism will shift from the green to the amber illumination.

In this instance, a separate switch housing 24′ is provided for controlling the energizing circuit of light 5′, having spring follower 25′ bearing against a cross-bar 26′ carried by the pivoted lever 42. A separate housing 24″ and spring follower 25″ bearing against bar 26′ is provided for controlling the energization of light 6′, and the housing 26 and spring follower 27 aligned with bar 26′ are retained for controlling the energization of light 7′.

In this arrangement, as the armature 35 is pulled in the lever 42 pivots counterclockwise, opening the switch controlling the energization of light 5′, and closing first the switch causing energization of light 6′ and then the switch causing energization of light 7′ to indicate a progressively increasing mechanical loading of the motor 1.

To provide a greater degree of adjustability, and consequent flexibility, any of the switch housings can be provided with an adjustable mounting, as illustrated in FIG. 5 wherein the housing 26 is pivoted at 47, its position being controlled by an adjustable set screw 48 to shift the physical location of the switch contacts relative to the cross bar 26′.

Instead of using multiple lights in combination with multiple lenses, the lenses can be swung past a single light, as illustrated in FIG. 6. Here the armature 35 is connected to a pivoted arm 42′ which is pivoted at 43′ and counterbalanced by a spring 44, and which carries three filters 51, 52 and 53 adapted to be swung past a single light source 54 to provide green, amber and red signals, in a manner similar to that described above.

Of course, if an intermediate indication is not required, or desired, the amber signal (6, 6′ or 52) can be dispensed with in each embodiment. Also, if desired, the indication provided by the mechanism of my invention can be recorded, by attaching stylus 55 to the armature 35, which stylus is adapted to record in ink on a graph 56 which can be moved past the stylus by any desired means. To simplify the reading, the graph can be divided into portions 57, 58 and 59 colored green, amber and red.

In addition, alarms and other types of signals can be actuated by the mechanism of my invention.

Accordingly, it is seen that my invention fully accomplishes its intended objects in a very simple and expedient manner, providing a clear and unmistakable indication as to the condition of the driven machine relative to a desired operating condition, without requiring translation or interpretation by the attendant. Where it is desired to drive the load 2 very hard, the red and the green lenses can be interchanged, to accommodate the changed mode of operation. While I have disclosed and described in detail certain illustrative embodiments of my invention, I do not thereby intend to be limited to such details. Instead, I am aware that changes and modifications might be made by those skilled in the art without departing from the spirit of my invention and the scope of the appended claims.

Having fully disclosed and completely described my invention together with its mode of operation, what I claim as new is:

1. A mechanism for indicating the relative mechanical load on a drive motor comprising, in combination with an electric motor driving a variable mechanical load and an energizing circuit for said motor, solenoid means connected to said energizing circuit so as to be energized in proportion to the energization of only said motor whenever the latter is energized, said solenoid means having movable armature means the position of which is determined by the degree of energization of said solenoid means, multiple indicator means, and means sequentially actuating said indicator means in response to changes in the position of said armature means, wherein said motor is of the multi-phase type, said solenoid means comprising separate windings for each phase, and said armature means comprising separate armatures for said solenoid windings, said armatures being interconnected for movement in unison by non-magnetic coupling elemets.

2. A mechanism as set forth in claim 1, wherein said indicator means include recording means.

3. A mechanism as set forth in claim 1, wherein said indicator means comprise separate indicators sequentially actuated by said armature means, together with means for selectively varying the position at which a particular one of said indicators is actuated by said armature means.

4. A mechanism as set forth in claim 1, together with adjustable means resisting movement of said armature in response to increasing energization of said solenoid means.

5. A mechanism as set forth in claim 1, together with counterbalance means maintaining said armature means in an intermediate position when said solenoid means is deenergized.

6. A mechanism as set forth in claim 1, wherein said indicator means comprise individual illuminating means, together with means for sequentially energizing said illuminating means in response to changes in the position of said armature means.

7. A mechanism as set forth in claim 6, wherein said sequential energizing means comprise energizing circuit means and multiple control switch means therefor.

8. A mechanism as set forth in claim 7, wherein said armature means are rectilinear and arranged to sequentially actuate said control switch means.

9. A mechanism for indicating the relative mechanical load on the drive motor comprising, in combination with an electrical motor driving a variable mechanical load and an energizing circuit for said motor, solenoid means connected to said energizing circuit so as to be energized in proportion to the energization of only said motor whenever the latter is energized, said solenoid means having movable armature means the position of which is determined by the degree of energization of said solenoid means, indicator means, and means actuating said indicator means in response to the position of said armature means for indicating the degree of energization of said motor and thereby indicating the mechanical load thereon, wherein said motor is of the multi-phase type, said solenoid means comprising separate windings for each phase, and said armature means comprising separate armatures for said solenoid windings, said armatures being interconnected for movement in unison by non-magnetic coupling elements.

References Cited in the file of this patent
UNITED STATES PATENTS

| | | |
|---|---|---|
| 266,244 | Weston | Oct. 17, 1882 |
| 335,687 | Drake | Feb. 9, 1886 |
| 345,561 | Wightman | July 13, 1886 |
| 495,225 | Lintner | Apr. 11, 1893 |
| 1,194,202 | MacGahan | Aug. 8, 1916 |
| 1,542,489 | Ceever | June 16, 1925 |
| 2,134,777 | Clancy | Nov. 1, 1938 |
| 2,164,473 | Randolph | July 4, 1939 |
| 2,292,736 | Betz | Aug. 11, 1942 |
| 2,515,259 | O'Brien et al. | July 18, 1950 |
| 2,605,304 | Proctor et al. | July 29, 1952 |
| 2,653,853 | Goodwin | Sept. 29, 1953 |
| 2,926,058 | Phillips | Feb. 23, 1960 |